United States Patent [19]

Kumar

[11] Patent Number: 5,479,001
[45] Date of Patent: Dec. 26, 1995

[54] RIGHT- AND LEFT-HANDED OPERABLE, GRIP-HELD PEN COMPUTING DEVICE WITH REMOVABLE DATA ENTRY MODULES

[75] Inventor: Rajendra Kumar, Akron, Ohio

[73] Assignee: Khyber Technologies Corporation, Fairlawn, Ohio

[21] Appl. No.: 278,922

[22] Filed: Jul. 22, 1994

[51] Int. Cl.[6] .................................................. G06K 7/10
[52] U.S. Cl. ............................................................ 235/472
[58] Field of Search ................................. 235/472, 462; 364/708.1

[56] References Cited

U.S. PATENT DOCUMENTS

| | | | |
|---|---|---|---|
| D. 320,013 | 9/1991 | Siemiatkowski et al. | D14/116 |
| D. 325,574 | 4/1992 | Carver | D14/116 |
| 4,621,189 | 11/1986 | Kumar et al. | 235/472 |
| 4,727,245 | 2/1988 | Dobbins et al. | 235/472 |
| 4,983,818 | 1/1991 | Knowles | 235/472 |
| 5,023,438 | 6/1991 | Wakatsuki et al. | 235/472 |
| 5,059,778 | 10/1991 | Zouzoulas et al. | 235/472 |
| 5,144,120 | 9/1992 | Krichever et al. | 235/472 |
| 5,322,991 | 6/1994 | Hanson | 235/472 |
| 5,369,262 | 11/1994 | Dvorkis et al. | 235/472 |

FOREIGN PATENT DOCUMENTS 6274667  9/1994  Japan .

OTHER PUBLICATIONS

Advertisement for PPT4100 Portable Pen Terminal With Integrated Scanner, Symbol Technologies, Inc. (Jan. 1994).
"Pen Based Buyer's Guide", *Pen Computing Magazine*, vol. 1, No. 1, pp. 86–89 (Aug. 1994).

"PDA Buyer's Guide", *Pen Computing Magazine*, vol. 1, No. 1, pp. 83, 84 (Aug. 1994).

Advertisement for PTC–960 Advanced Integrated RF Microcomputer, Telxon Corporation (Jul. 1991).

Advertisement for 1000 Series Modular RF Terminals, Norand Corporation (Oct. 1993).

Advertisement for Videx OmniWand, Videx, Inc. (GCO448–undated).

Primary Examiner—Donald T. Hajec
Assistant Examiner—Mark Tremblay
Attorney, Agent, or Firm—Howard S. Robbins

[57] ABSTRACT

A portable hand-held device (10) for data collection by an operator includes a grip unit (12) having polarized connectors (31, 32) at the top and bottom thereof for removable engagement with mating polarized connectors (33, 34) in external modulus (14) furnishing operator selectable, application functions such as CCD or laser scanning, and radio frequency automatic identification. Device (10) is held and operable by one hand in either right- or left-handed configurations with the output from modules (14) directed away from the operator and toward the object from which data is to be obtained. The connectors (31, 32) are mounted in reversed orientation from each other, thereby insuring that external removable modules (14) are automatically connected in the proper orientation for the desired handed operation.

15 Claims, 5 Drawing Sheets

RIGHT- AND LEFT-HANDED OPERABLE, GRIP-HELD PEN COMPUTING DEVICE WITH REMOVABLE DATA ENTRY MODULES

TECHNICAL FIELD

The present invention relates in general to devices for data collection. More particularly, the present invention pertains to portable devices for data entry and remote automatic identification. More specifically, the present invention relates to portable, pen computing devices for data collection suitable for both left-handed and right-handed grip-held operation and having removable data entry modules.

BACKGROUND ART

Portable devices that allow an operator to collect and review data have been developed for a wide variety of applications and have become highly popular as a cost effective mechanism by which to perform a number of essential business activities such as inventory data collection and communication functions such as automatic product identification and inventory review. While the specific features of such devices vary dependent upon the application, nearly all are designed for and require hand-held use. And in the vast majority of applications, the traditional data input source—the keyboard—is impractical or impossible to use. Consequently, a class of portable computing devices has been established that relies on a compact pointer such as a pen, stylus or finger to enter data through a proximity or touch sensitive display. Virtually all these devices, commonly referred to as pen or pen-based computers, furnish a microprocessor based, tablet-sized control unit that is cradled with one hand and operated with the other hand. A very few pen computers, such as the Model PPT4100 made by Symbol Technologies, Inc. of Bohemia, N.Y., and the Model Pen*Key made by Norand Corporation of Cedar Rapids, Iowa, provide for the optional attachment of an optical (such as laser or CCD) or electromagnetic scanner for automatic interrogation and identification of items on which suitable, corresponding optical or electromagnetic identifiers such as tags or bar-code labels have been placed.

The majority of the hand-held devices heretofore designed to permit data collection and communication have either integrated all components required for the functionality demanded in a given application into a single package, or have permanently joined a plurality of separate modules (e.g., power, microprocessor control and scanner) in a single package. For example, hand-held data collection terminals with integral scanners are disclosed in U.S. Pat. Nos. Des. 325,574 and 5,144,120. Some similar devices also include a pistol grip handle to reduce fatigue when used to scan over longer periods of time, such as that shown in U.S. Pat. No. Des. 320,013 and the Model PTC-960 from Telxon Corporation of Fairlawn, Ohio. U.S. Pat. No. 5,059,778 presents a portable data scanner apparatus that fixedly joins a scanner module, a data module and a power module into a single, self-contained unit having a pistol grip handle.

While integrating all required components for a given application into a single unit may allow less costly manufacture, the inherently limited functionality and inflexibility of integrated units frequently may result in higher ultimate costs to the purchaser/operator with multifunctional applications or with needs changing over time. Moreover, where efforts are made to address multiple applications in a single unit having fixed components, compromises must be or are made that reduce specific application optimization.

One increasingly common approach to overcoming the limited flexibility and often ultimately higher costs of a fixed application device has been to manufacture distinct component functionality in separate modules which may be attached to a base unit. Two more recent examples of this approach may be found in the 1000 Series Modular RF Terminals sold by Norand Corporation of Cedar Rapids, Iowa, and the OmniWand commercially available from Videx, Inc. of Corvallis, Oreg. The Norand 1000 Series allows attachment of a single backpack selected from a variety of backpacks having different combinations of features. The Videx OmniWand allows attachment of a single module selected from a variety of modules having a single function within each module.

In U.S. Pat. Nos. 4,621,189 (invented by me), and 4,983,818 hand-held data acquisition terminals are shown having a keyboard for manual data input and including a single connector for releasable engagement with a separate laser scanner module, allowing operation as a manual data input terminal or scanner. When the scanner module is attached and operating, one hand of the operator holds the terminal and aims the scanner beam while the operator's other hand presses a keyboard button to actuate scanned data acquisition. The connector described in my U.S. Pat. No. 4,621,189 is symmetrical and includes two mirror image rows of contacts so that the scanner module may be attached with the scan beam directed to either the right or left of the terminal, allowing the operator to hold the terminal with either the right or left hand, and operate the keyboard with the other hand.

Unfortunately, these data collection terminals still suffer from deleterious limitations. Single module attachments skew the weight distribution of the hand-held device, making it unbalanced, uncomfortable and difficult to hold and operate for extended periods of time, a problem that escalates as the features and weight of the modular attachment increases and is further exasperated by the need for two-handed operation. Also, because only one module is attachable at a time, more frequent module swaps are necessary in certain changing data collection applications. Perhaps most significantly, no hand-held device with replaceable modules permits one-hand operation in both right- and left-handed configurations, particularly with the simultaneous connection of two modules.

SUMMARY OF THE INVENTION

It is, therefore, an object of the present invention to provide a portable device for data collection, and optionally data communication and review, to which at least two operator installable and removable modules for data collection or communication may be simultaneously connected suitable for one-handed operation in both right- and left-handed configurations.

It is another object of the present invention to provide a device, as set forth above, which facilitates the balancing of module weight and provides the operator with more comfortable, stress-free operation over extended periods of time.

It is still another object of the present invention to provide a device, as set forth above, that allows the operator to rapidly, effortlessly and unerringly configure and reconfigure the device to operate with any desired modules in either right- or left-handed configurations.

It is yet another object of the present invention to provide a device, as set forth above, that allows review of collected data in an orientation that optimizes display utilization.

These and other objects and advantages of the present invention over existing prior art forms will become more apparent and fully understood from the following description in conjunction with the accompanying drawings.

In general, in accordance with the present invention, a portable, hand-held device suitable for data collection by an operator in both right-handed and left-handed held configurations includes a grip unit held during operation by a hand of the operator, a module for data collection, a first connector, and a second connector. The grip unit has a first surface and a substantially opposing second surface. The first surface is gripped by at least one fingertip of the hand of the operator when the grip unit is held in the operator's right hand and when the grip unit is held in the operator's left hand. The second surface is gripped by at least the thumb of the hand of the operator when the grip unit is held in the operator's right hand and when the grip unit is held in the operator's left hand. The module generates a data collection signal and includes a module connector for selective installation with and removal from a mating connector by the operator. The first connector is carried by the grip unit and is matable with the module connector; the second connector is carried by the grip unit and is matable with the module connector. The signal generated by the module is directable substantially away from the operator when the grip unit is operated in both right-handed and left-handed held configurations and the module connector is mated to both the first connector and the second connector.

REFERRED EMBODIMENT FOR CARRYING OUT THE INVENTION

Figure 1:
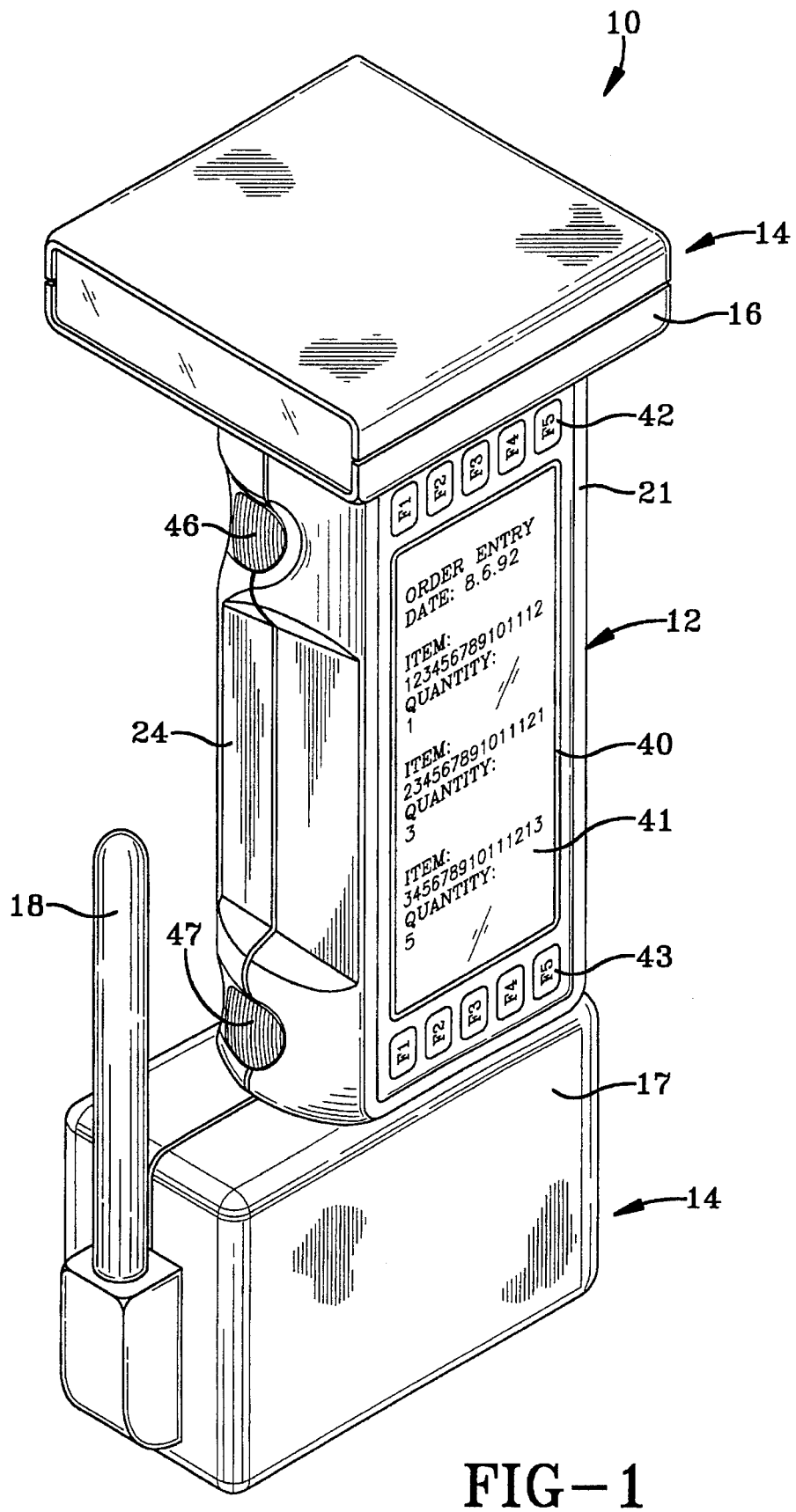
FIG. 1 is a perspective view of an exemplary device in accordance with the present invention depicting a grip-held data entry device suitable for right- and left-handed operation, and configured for right-handed operation. This exemplary device is shown having a central, substantially rectangular block shaped grip unit, an optical scanner removably mounted on a first short edge of the grip unit referred to as the right-handed top, and a radio-frequency communication unit removably mounted on the opposite short edge of the grip unit referred to as the right-handed bottom.
Figure 3:
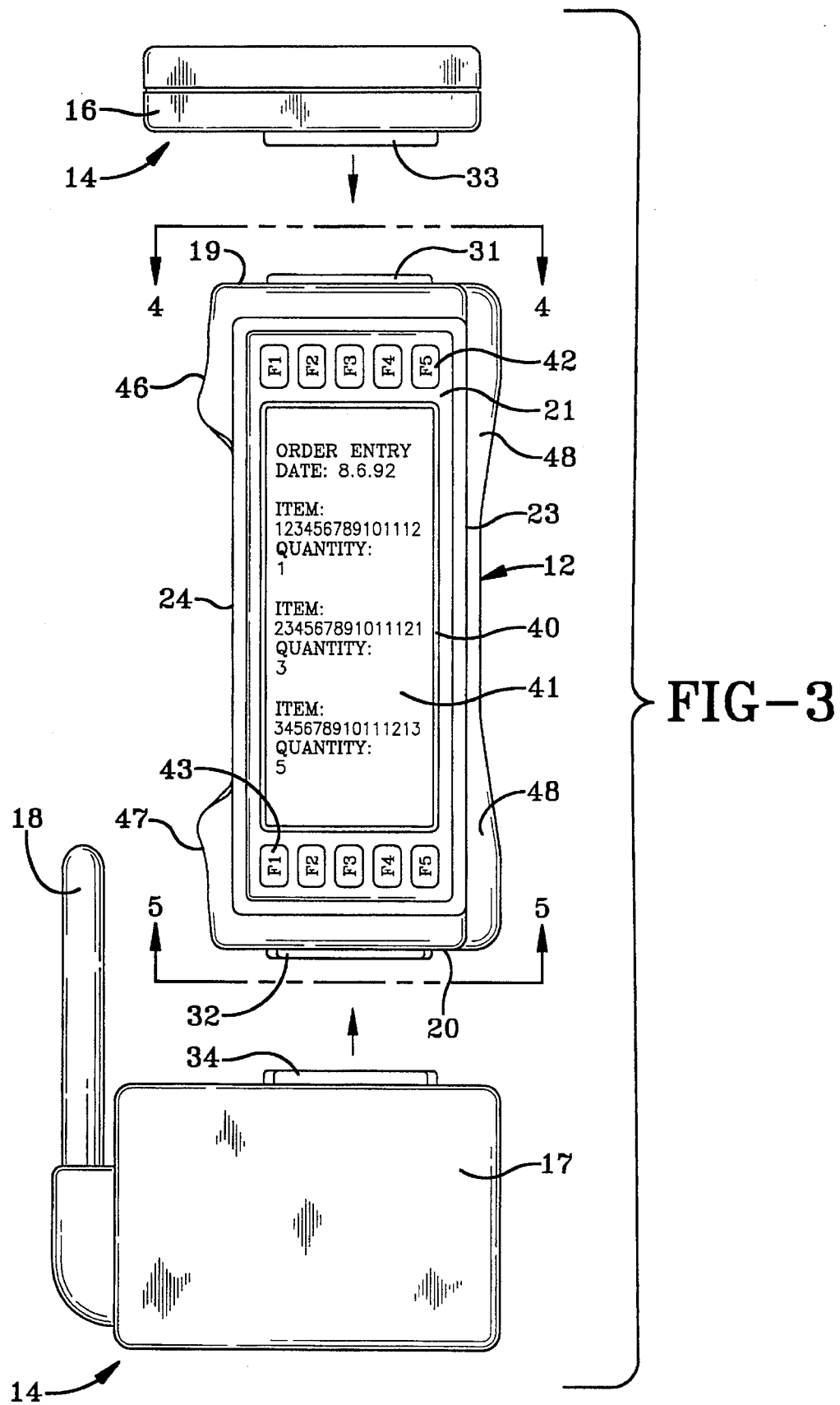
FIG. 3 is a front elevational view of the device shown in FIG. 1 as configured in FIG. 1 in which the optical scanner and radio communication modules are illustrated detached from grip unit.
Figure 4:
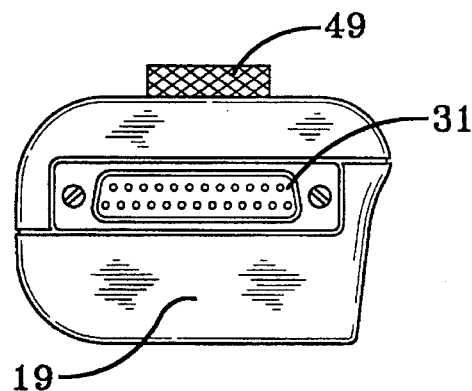
FIG. 4 is a top view of the exemplary grip unit shown in FIG. 1 taken substantially along the line 4—4 of FIG. 3 and presenting the polarized right-handed top connector.
Figure 5:
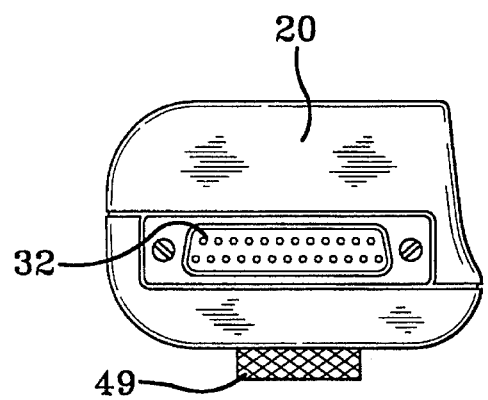
FIG. 5 is a top view of the exemplary grip unit shown in FIG. 1 taken substantially along the line 5—5 of FIG. 3 and presenting the polarized right-handed bottom connector.
Figure 6:
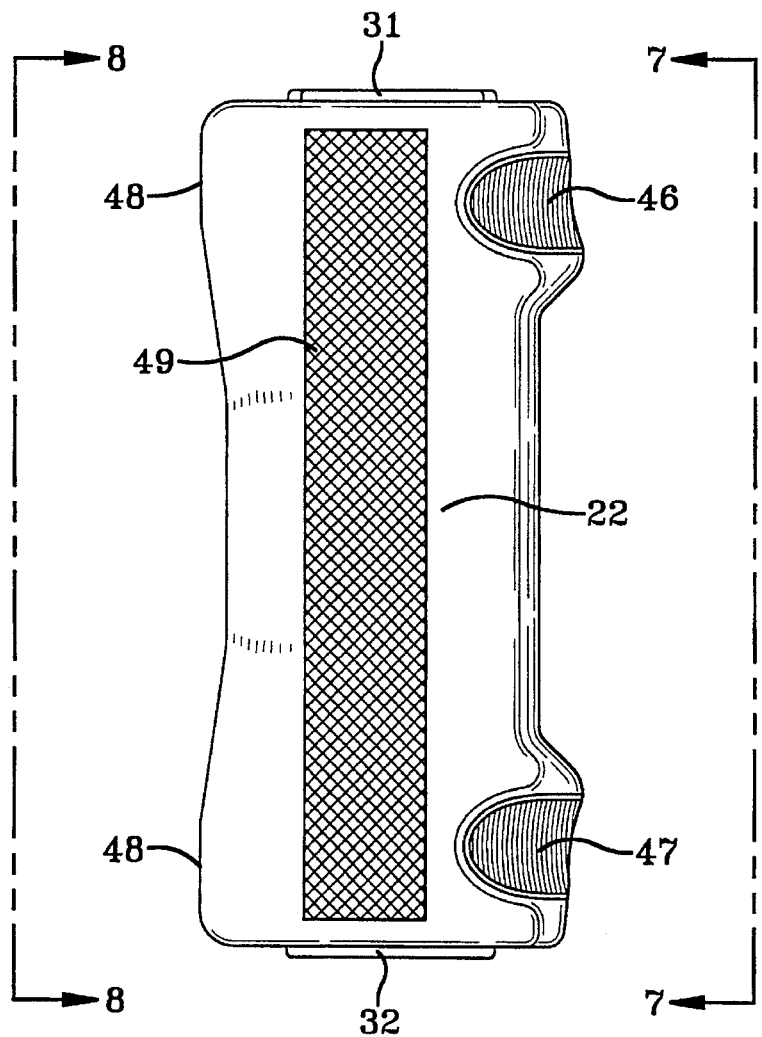
FIG. 6 is a rear elevational view of the exemplary grip unit shown in FIG. 1.
Figure 7:
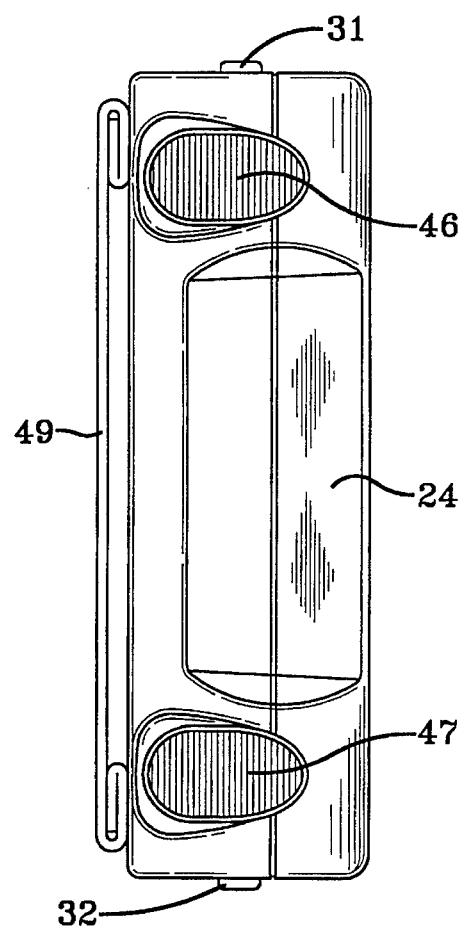
FIG. 7 is a left side view of the exemplary grip unit shown in FIG. 1.
Figure 8:
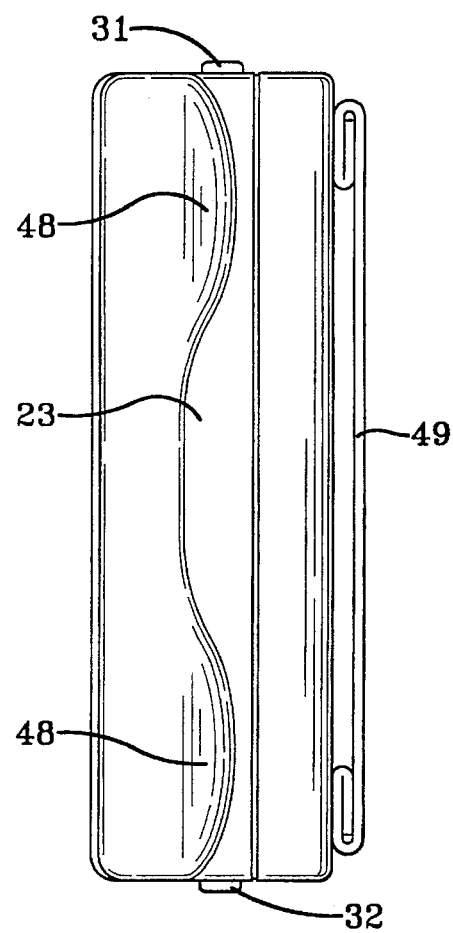
FIG. 8 is a right side view of the exemplary grip unit shown in FIG. 1.

FIG. 1 presents in perspective an exemplary portable, right- and left-handed operable grip-held device in accordance with the present invention, generally indicated by the numeral 10, for data collection by an operator. Device 10 includes broadly a substantially rectangular block shaped, grip-held, data collection control and display unit 12 (hereinafter called grip unit 12) and one or more removable modules 14, such as the depicted exemplary scanner module 16 and radio frequency communications module 17, detachably carried by grip unit 12. The exemplary device of FIG. 1 is configured for right-handed operation, as will become more apparent following the discussion hereinbelow. FIG. 3 provides a corresponding, partially exploded front elevational view of the exemplary device 10 of FIG. 1 in which modules 16 and 17 are detached. Corresponding top, bottom, rear, left side and right side views of grip unit 12 as depicted in FIG. 1 are shown in FIGS. 4, 5, 6, 7 and 8, respectively.

In addition to the right-handed operational orientation depicted in FIG. 1, device 10 may be operated in a sideways-held orientation, which may be called text mode and has been found to be most suitable for data review and communication, and in a left-handed orientation. The present invention allows the operator to rapidly, effortlessly and unerringly configure and reconfigure device 10 to operate in this latter, text mode orientation, or in either right-handed or left-handed configurations with any desired removable modules.

Inasmuch as device 10 operates in more than one orientation, solely for the purpose of clarity a single convention shall be followed herein to identify the various surfaces of grip unit 12, and it shall be the customary convention for a six-sided rectangular block shaped object in its right-handed configuration. Thus, when grip unit 12 is in the right-handed configuration of FIGS. 1 and 3 through 8, the surface of grip unit 12 closest to line 4—4 in FIG. 3 shall be referred to as the (right-handed) top 20, the surface of grip unit 12 closest to line 5—5 in FIG. 3 shall be referred to as the (right-handed) bottom 21, and the remaining surfaces shall be referred to as the front 22, back 23, (right-handed) right side 24 and (right-handed) left side 25.

The dual-handed operational orientation of the present invention is accomplished by use of connectors in both grip unit 12 and modules 14 that establish necessary or desirable electrical connections, provide and maintain mechanical support for modules 14 in the proper orientation for the selected right- or left-handed operation, and permit the rapid engagement and disengagement of modules 14 with grip unit 12. If mounted in the proper orientation explained hereinbelow, a variety of polarized, connectors may be suitable therefor, such as the widely commercially available DIN connector or the D-subminiature shell connector utilized in the embodiment illustrated in the drawings, and best viewed in the right-handed top and bottom views of FIGS.

4 and 5. As is well known, each of the sides of such connectors is of differing length or angular orientation, making mating sockets and plugs engagable in only one orientation. In the present example, 25-pin D-subminiature shell connectors have been found to possess adequate mechanical strength to carry the various modules 14 and sufficient conductors for all power and signal requirements.

Accordingly, in the right-handed configuration of FIGS. 1, and 3 through 8, grip unit 12 includes two 25-pin D-subminiature shell connector sockets, top socket 31 and bottom socket 32 for selected, removable engagement with the 25-pin D-subminiature shell connector plug included with each of the modules 14 (plug 33 in module 16, plug 34 in module 17). Top socket 31 is carried by grip unit 12 as by mounting to a printed circuit board within (not shown) grip unit 12 and extends through the right-handed top with the longer side of its shell facing the front 21 of grip unit 12. Bottom socket 32 is carried by grip unit 12 as by mounting to the printed circuit board (not shown) within grip unit 12 and extends through the righthanded bottom 20 with the shorter side of its shell facing the front 21 of grip unit 12. Thus, sockets 31 and 32 are carried by grip unit 12 in opposite orientations.

The 25-pin D-subminiature shell connector plug 33 is carried by scanner module 16 as by mounting to a printed circuit board (not shown) within scanner module 16 and extending through the bottom of the housing such that when it is inserted into top socket 31 or bottom socket 32 the scanner beam will exit scanner module 16 away from the operator when held in the right-handed orientation, i.e., toward the left side of grip unit 12. Similarly, the 25-pin D-subminiature shell connector plug 34 is carried by radio frequency communications module 17 as by mounting to a printed circuit board (not shown) within module 16 and extending through the bottom of the housing such that when it is inserted into top socket 31 or bottom socket 32 the external antenna 18 emanating from radio frequency communications module 17 will exit grip unit 12 on the side away from the operator when held in the right-handed orientation, i.e., toward the left side of grip unit 12.

Figure 2:
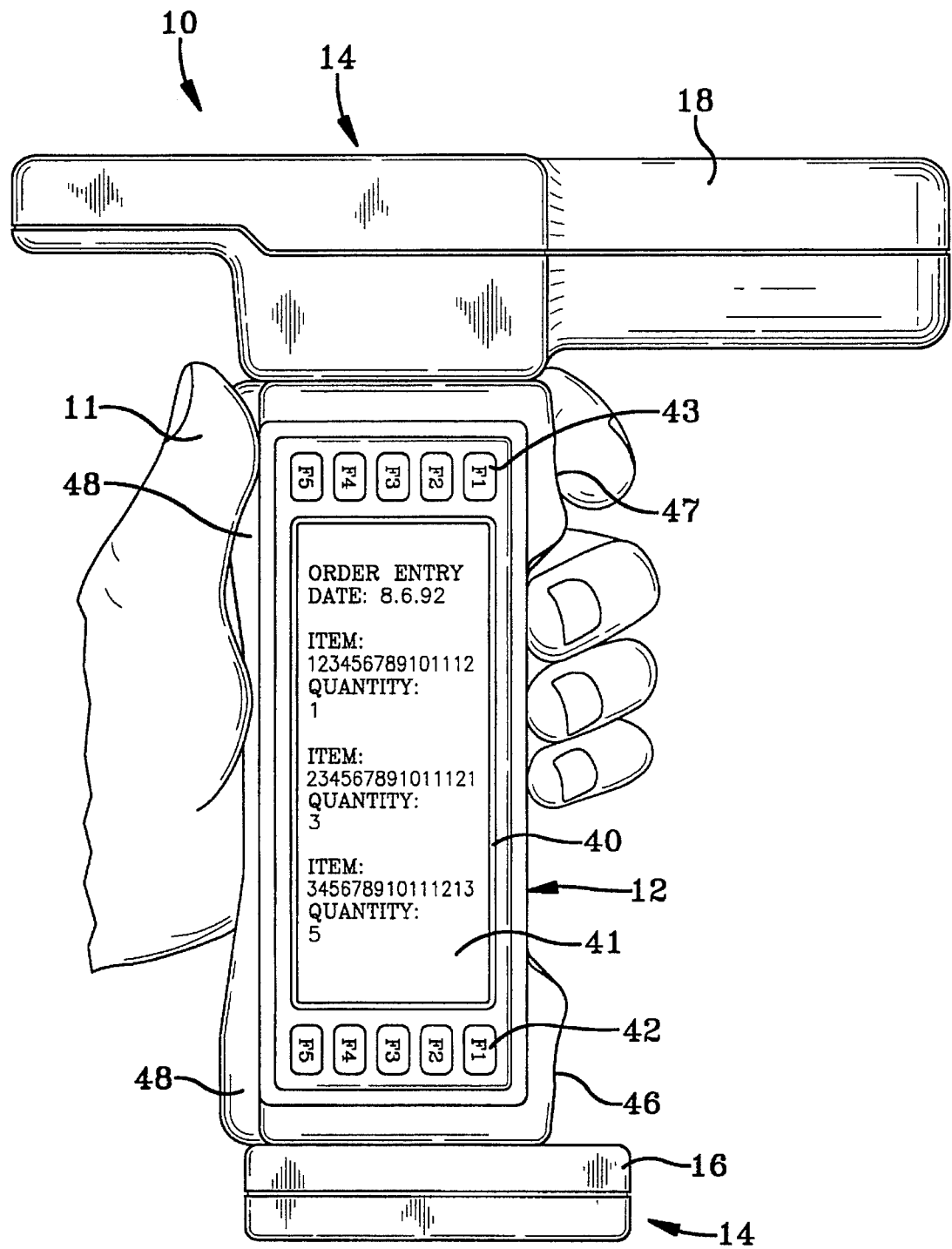
FIG. 2 is a front elevational view of the device shown in FIG. 1 configured for left-handed operation with a radio-frequency identification unit removably mounted on left-handed top and an optical scanner removably mounted on the left-handed bottom. An operator's left hand is depicted gripping the device.

Device 10 may be rapidly, effortlessly and unerringly configured for either right- and left-handed operation, as explained further hereinafter. An exemplary left-handed configuration is illustrated in FIG. 2 where an operator's left hand 11 is shown comfortably grasping grip unit 12 to which a removable scanner module 16 is connected at the bottom, and a removable radio-frequency automatic identification module 18 is connected at the top. Grip unit 12 is to be kept sufficiently narrow to allow such handholding, and, as hereinafter more fully explained, allow balanced operation, permit grip unit 12 to fit within an operator carried holster, and lay or stand flat on horizontal surfaces in an upright position, with all desired functionality in device 10.

As perhaps best seen in FIG. 3 and its corresponding views, grip unit 12 includes a housing which may be formed by molding or other acceptable means of a suitable material such as a rigid plastic suitable to integrally carry the desired components in a substantially rectangular block. Grip unit 12 includes a rectangular display 40 positioned on its front 21, and may optionally include a pen input panel 41 over rectangular display 40 and a plurality of function buttons disposed in two rows 42, 43 above the top and below the bottom of display 40, respectively. Two contoured pushbuttons 46, 47 may extend in proximity to the top and bottom ends of the side of grip unit 12 facing away from the operator, i.e., in the present example, the left side 24 of grip unit 12. Pushbuttons 46, 47 are actuated by the operator's index finger for initiating the installed modular function such as the laser or CCD scanner. A contoured thumb backstop 48 may extend from the right side 23 and furnish a rigid surface behind the location where the operator's thumb would contact grip unit 12, thereby further securing the operator's grip. An elastic strap 49 for further holding grip unit 12 to the operator's hand may be affixed lengthwise on the back 22 of grip unit 12.

As best seen in FIG. 2, the operator's hand 11 may comfortably grasp grip unit 12 with the thumb extending along thumb backstop 22, the operator's palm biased against the back 22 by elastic strap 49, the tip of the index finger positioned over pushbutton 46, and the ends of the remaining fingers positioned therebelow on left side 24. In this configuration, the index finger does not support device 10 and is free to press or release pushbutton 46 as desired; indeed, device 10 may be supported solely by the operator's thumb and middle finger.

Operation of device 10 is straightforward. If device 10 is to be used for data collection, the operator first decides what modules are necessary and whether to use device 10 right- or left-handed. Grip unit 12 may for convenience be grasped by the hand which is to hold it with pushbuttons 46, 47 facing away from the operator. In this configuration the top and bottom will be appropriately oriented. The operator may simply disconnect any supplemental mechanical attachment mechanism such as the optional screws available in D-shell connectors, and pull any unwanted or improperly positioned modules out of their mating connector socket 31, 32, and the connector plug 33, 34 of the desired module(s) 14 inserted in the appropriate connector socket 31, 32 for the desired top or bottom operation and grip unit 12 may be operated in either hand without having to change any previously inserted modules 14. Because of the polarized nature of the connectors and the opposing orientation of connector sockets 31, 32, the desired module(s) will immediately engage in only the correct configuration for the chosen right- or left-handed operation. While not part of the present invention, the data processor may be programmed such that when a pushbutton 46, 47 is pressed continuously for a preselected period of time, say three seconds, the display is activated in the proper, correct side up orientation for the chosen right- or left-handed operation.

Figure 9:
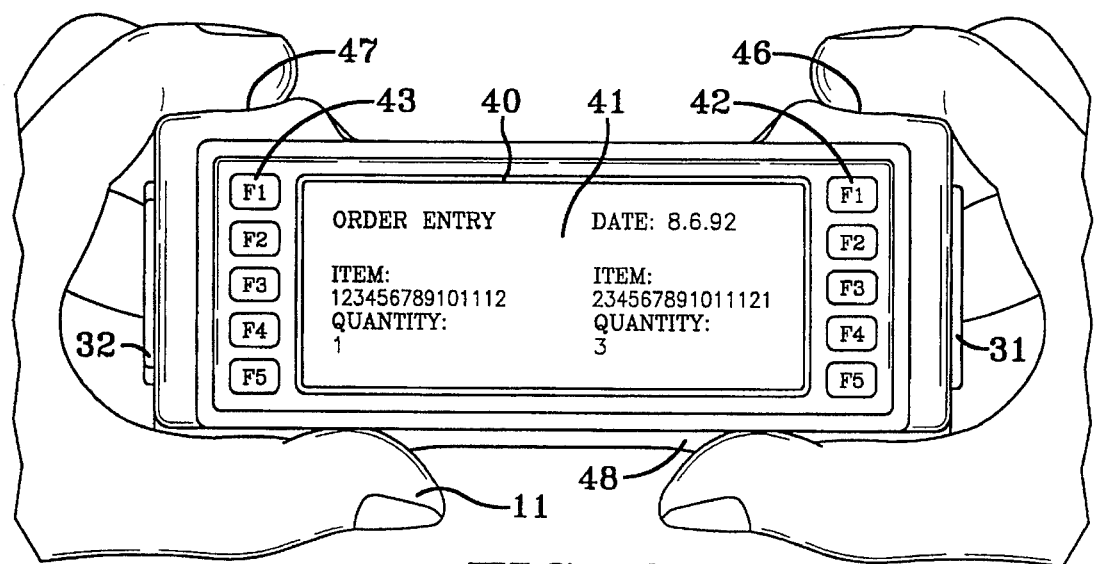
FIG. 9 is a front elevational view of the exemplary grip unit shown in FIG. 1, depicting an operator's hands holding and operating the device in a so-called text mode in which the grip unit is rotated ninety degrees (90°). In this operational mode the left side of the grip unit is held at the top, the right side of the device is held at the bottom, and information is displayed with the longer edges of the display at the top and bottom.

If device 10 is to be used for more extensive data review with possibly longer display messages, turning grip unit 12 sideways with pushbuttons 46, 47 facing up will allow best utilization of the rectangular display 40. As pictured in FIG. 9, the operator may use one or both hands to hold grip unit 12, positioning the thumb and tip of the index finger as when device 10 is used in a data collection configuration: the thumb is placed on the (right-handed) left side 24 (the bottom in the text mode configuration) at the end closest to it, and the tip of the index finger is placed on contoured pushbuttons 46, 47. While not part of the present invention, the data processor may be programmed such that when pushbuttons 46, 47 are pressed simultaneously and continuously for a preselected period of time, say three seconds, the display is activated in the sideways, text mode orientation.

In this manner, the operator may hold grip unit 12 in the left or right hand with scanner module 16 at the top 19 or bottom 20 of grip unit 12 as personally preferred for the application at hand, and the scan beam will always point away from the operator. Of course, it will be appreciated that any two modules 14 may be simultaneously connected to the mating connectors 31, 32 in grip unit 12, as the scanner module 16 and radio frequency module 17 shown in FIGS. 1, and 3 through 8, useful for such applications as gas bottle distribution routes where both kinds of item identification are utilized. Carrying two modules in this manner distributes the weight necessary for different functions more evenly on both sides of an operator's hand, like the end weights of a dumbbell, reducing stress and fatigue of holding grip unit 12 for extended periods of operation. It will be further appreciated that the operator may quickly, effortlessly and without error remove and/or change the inserted modules 14 as is required by the application currently to be performed and the personal preference of the operator.

Several modifications within the spirit of the present invention now should be evident to the skilled artisan. For example, while the embodiment described herein employs connector sockets in grip unit 12 and connector plugs in modules 14, so long as the proper orientation reversal discussed hereinabove is maintained the location of the connector sockets and plugs may be reversed. Also, while interference fit between the connector socket and the connector plug should be adequate to maintain the module 14 in place, any of the known supplemental mechanical techniques for securing sockets and plugs together may be optionally utilized therewith.

Additionally, aside from the polarized D-shell subminiature connector depicted herein and other polarized connectors, the present invention contemplates the use of any mating connection whose configuration insures modules 14 may be guided for installation in the correct orientation explained hereinabove. Thus, connectors 31, 32, 33, and 34 may be non-polarized and the housing of grip unit 12 and modules 14 in the vicinity of the connectors 14 made polarized. Alternatively, the operator may be guided in making a connection of the correct orientation by visual cues such as alignment dots and arrows as are commonly used on thirty-five mm camera bodies and lenses, or by instruction.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of portable data collection and, more particularly, grip-held data entry devices suitable for right- and left-handed operation.

I claim:

1. A portable, hand-held device suitable for data collection by an operator in both right-handed and left-handed held configurations, comprising:

a grip unit held during operation by a hand of the operator, said grip unit having a first surface and a substantially opposing second surface, said first surface gripped by at least one fingertip of said hand of the operator when said grip unit is held in the operator's right hand and when said grip unit is held in the operator's left hand, said second surface gripped by at least the thumb of said hand of the operator when said grip unit is held in the operator's right hand and when said grip unit is held in the operator's left hand;

a module for data collection having a module connector for selective installation with and removal from a mating connector by the operator, said module generating a data collection signal;

a first connector carried by said grip unit and matable with said module connector; and, a second connector carried by said grip unit and matable with said module connector, said signal generated by said module directable substantially away from the operator when said grip unit is operated in both right-handed and left-handed held configurations and said module connector is mated to both said first connector and said second connector.

2. A device, as set forth in claim 1, wherein said grip unit further has a third surface and a substantially opposing forth surface, said grip unit carrying said first connector at said third surface and carrying said second connector at said forth surface.

3. A device, as set forth in claim 2, wherein said third surface is proximate to one side of the operator's hand holding said grip unit, and said forth surface is proximate the location of the opposite side of the operator's hand holding said grip unit.

4. A device, as set forth in claim 3, wherein said third surface is the top of said grip unit and said forth surface is the bottom of said grip unit when said grip unit is held in one of the operator's right-hand and left-hand, and said third surface is the bottom of said grip unit and said forth surface is the top of said grip unit when said grip unit is held in the other of the operator's right-hand and left-hand.

5. A device, as set forth in claim 4, further including a guide to direct the operator when mating said module connector and one of said first connector and said second connector to place said module in an operational orientation whereby said signal generated by said module is directed substantially away from the operator when said grip unit is operated in both right-handed and left-handed held configurations.

6. A device, as set forth in claim 5, wherein said guide is a polarized connection that allows the operator to mate said module connector and one of said first connector and said second connector only in an operational orientation whereby said signal generated by said module is directed substantially away from the operator when said grip unit is operated in both right-handed and left-handed held configurations.

7. A device, as set forth in claim 6, wherein said first connector, said second connector and said module connector, are each polarized connectors.

8. A device, as set forth in claim 7, wherein said first connector and said second connector are carried by said grip unit in opposite orientation.

9. A device, as set forth in claim 8, wherein said first connector, said second connector and said module connector, are selected from the group including a D shell subminiature connector and a DIN connector.

10. A device, as set forth in claim 6, wherein said grip unit in the vicinity of said first connector and in the vicinity of said second connector, and said module in the vicinity of said module connector, are each polarized.

11. A device, as set forth in claim 10, wherein said first connector and said second connector are carried by said grip unit in opposite orientation.

12. A device, as set forth in claim 6, wherein said grip unit further includes a plurality of pushbuttons for actuation of said module by the index finger of the operator's hand holding said grip unit when holding and operating said grip unit in both right-handed and left-handed held configurations.

13. A device, as set forth in claim 6, wherein said grip unit further including a third surface and a forth surface, and said device further including at least two said modules, a first said module removably carried at said third surface and a second said module removably carried at said forth surface, whereby the weight of the device is substantially distributed on both sides of the operator's hand.

14. A portable, hand-held device suitable for data collection by an operator in both right-handed and left-handed held configurations, and review of data by the operator, comprising:

a grip unit held during data review operation by a hand of the operator, said grip unit having a first surface and a substantially opposing second surface, and a third surface, said first surface gripped by at least one fingertip of said hand of the operator when said grip unit is held in the operator's right hand and when said grip unit is held in the operator's left hand, said second surface gripped by at least the thumb of said hand of the operator when said grip unit is held in the operator's right hand and when said grip unit is held in the operator's left hand;

a first connector carried by said grip unit and matable with a mating module connector on a separate module;

a second connector carried by said grip unit and matable with said mating module connector on said separate module;

a display carried by said grip unit at said third surface, said display having a longitudinal axis oriented sideways during said data review operation; and, two pushbuttons carried by said grip unit at said first surface for actuating said data review operation.

15. A device, as set forth in claim 14, wherein said display is a pointer input display.

* * * * *